US012729415B2

(12) United States Patent
Popov et al.

(10) Patent No.: US 12,729,415 B2
(45) Date of Patent: Sep. 8, 2026

(54) REMELTING PLANT FOR METALS, AND METHOD FOR REMELTING METALS

(71) Applicant: ALD VACUUM TECHNOLOGIES GMBH, Hanau (DE)

(72) Inventors: Ivaylo Popov, Hanau (DE); Lothar Lippert, Alzenau (DE); Stefan Lemke, Frankfurt am Main (DE); Thomas Kilzer, Niedernberg (DE)

(73) Assignee: ALD VACUUM TECHNOLOGIES GMBH, Hanau (DE)

( * ) Notice: Subject to any disclaimer, the term of this patent is extended or adjusted under 35 U.S.C. 154(b) by 462 days.

(21) Appl. No.: 18/555,793

(22) PCT Filed: Mar. 17, 2022

(86) PCT No.: PCT/EP2022/057041
§ 371 (c)(1),
(2) Date: Oct. 17, 2023

(87) PCT Pub. No.: WO2022/223208
PCT Pub. Date: Oct. 27, 2022

(65) Prior Publication Data

US 2024/0209473 A1 Jun. 27, 2024

(30) Foreign Application Priority Data

Apr. 19, 2021 (DE) ..................... 10 2021 109 823.8

(51) Int. Cl.
*C22B 9/18* (2006.01)
*C22B 9/20* (2006.01)
*F27D 11/08* (2006.01)

(52) U.S. Cl.
CPC .................. *C22B 9/18* (2013.01); *C22B 9/20* (2013.01); *F27D 11/08* (2013.01)

(58) Field of Classification Search
None
See application file for complete search history.

(56) References Cited

U.S. PATENT DOCUMENTS

| | | | |
|---|---|---|---|
| 4,993,690 | A | 2/1991 | Stenzel et al. |
| 2018/0172353 | A1 | 6/2018 | Popov |

FOREIGN PATENT DOCUMENTS

| | | | | |
|---|---|---|---|---|
| CN | 101457297 | A * | 6/2009 | |
| DE | 102016100372 | A1 | 7/2017 | |
| DE | 102016124481 | B4 | 7/2021 | |
| EP | 0378764 | A1 | 7/1990 | |

OTHER PUBLICATIONS

English Translation of International Search Report dated Jul. 19, 2022, prepared in International Application No. PCT/EP2022/057041.

* cited by examiner

*Primary Examiner* — Anthony M Liang
(74) *Attorney, Agent, or Firm* — Barnes & Thornburg LLP; Ryan L. Marshall

(57) ABSTRACT

The present invention relates to remelting plants, such as for example vacuum arc remelting furnaces (VLBO/VAR) and electro slag remelting plants (ESU/ESR), which possess one or several melting sites and have a portal structure. The plants possess a symmetric force distribution and a constantly low height of construction.

12 Claims, 6 Drawing Sheets

REMELTING PLANT FOR METALS, AND METHOD FOR REMELTING METALS

CROSS-REFERENCE TO RELATED APPLICATIONS

This application is a National Stage application of International Application No. PCT/EP2022/057041, filed Mar. 17, 2022. This application also claims priority under 35 U.S.C. § 119 to German Patent Application No. 10 2021 109 823.8, filed Apr. 19, 2021.

The present invention relates to remelting plants for metals, such as for example vacuum arc remelting furnaces (VLBO/VAR) and electro slag remelting plants (ESU/ESR), which possess one or several melting sites and have a portal structure. The plants possess a symmetric force distribution and a constantly low height of construction.

PRIOR ART

From prior art diverse methods and plants for remelting metals are known. These include, for example, vacuum arc remelting furnaces (VLBO/VAR) and electro slag remelting plants (ESU or ESR). Preferably, they are used in special metallurgy for remelting and refining different metallic reactive or non-reactive materials such as for example tool steels, nickel-based alloys, titanium, zirconium, etc. For being able to fulfil the high requirements with respect to the quality of the materials which are an outcome of this, during the last decades of the development of the remelting technology these plants were utilized as completely closed, nearly always vacuum- or even vacuum- and pressure-tight aggregates.

Substantially, they consist of one or several—mostly two—melting sites, a load-bearing structure in the form of a portal or a self-supporting column and a vertically movable electrode rod which is guided on it, a balance and a furnace chamber, which may be designed either as a vacuum vessel or as a pressure vessel. Via respective drives the plant can be opened and closed for being able to insert the electrode which has to be melted therein and to lift the block out of the plant, which after the melting has been produced out of it.

The plants, which as a load-bearing structure comprise a self-supporting column, have the disadvantage that the elements which are relevant for the function—electrode rod, balance, and furnace chamber—are laterally fastened at the column on single side arms, and therefore unsymmetric forces are acting on the load-bearing structure, which result in enormously high bending moments in the whole structure. Quite often the bending moments even mainly act on the foundation of the column. In the case of this concept, also the electrode rod is moved by an electrode rod drive, which is positioned laterally and fastened on the load-bearing column. Exactly this design intensifies the above-described disadvantages of the plant. However, plants of this construction type also provide an important property. In the case of a well-made construction, the opening and the closing of the plant can be achieved without a change of the height of the plant. Therefore, the total height remains constant.

The plants, which as a load-bearing structure use a portal, in turn, have the disadvantage that their height during opening and closing is changed. During opening, often, the height of the plant is considerably increased. This disadvantage, very often, results in the fact that such plants can only be accommodated in very high factory work rooms, which results in high investment costs for the establishment of the plant and its periphery. The advantage of this plant concept is the symmetric distribution of the forces. The functional components—electrode rod, balance, and furnace chamber—are fastened in a vertically movable manner, symmetrically on both columns forming the portal. Thus, the forces, which arise in the load-bearing structure, in the case of this plant concept are also symmetric. Normally, in the foundation also no bending moment is created.

A further structure which is known from prior art consists of a portal, in which the functional components of the plant are symmetrically arranged, and of a melting site, which includes a melting crucible with a very high top part. With the high top part on the crucible the height of the furnace chamber is minimized such that the lift of the furnace chamber required for the opening of the plant is minimized, and thus the height of the plant during the opening of the plant is increased only minimally. The disadvantage of this plant concept is that the long top part of the crucible—often referred to as spacer or intermediate piece—is yet another interface between crucible and chamber, which negatively influences the whole handling and first of all the tightness of the plant.

A further plant concept which is known from prior art is based on the use of a portal, on which the balance and the electrode rod are mounted and below which a vertically divided protective gas device consisting of two half shells and a hood with a duct for the electrode rod is suspended. This plant concept includes a coaxially driven electrode rod, on the upper end of which the electrode rod drive is fastened, wherein the electrode rod drive is supported via two load-bearing columns which are symmetrically arranged with respect to the electrode rod itself on the subjacent balance, and the balance, in turn, is fastened on the portal. The electrode rod runs through the electrode rod duct and through the hood into the melting room, which is formed by the two half shells. The large disadvantage of this concept is exactly the three-part protective gas device. In practice, it can only insufficiently be made vacuum or pressure tight.

For example, from CN 102 703 725 A an electro slag remelting furnace for single electrodes having a weight of 30-120 t is known. The solution disclosed there addresses the problems, which normally arise in the case of the common load-bearing column arms, when such heavy weights are fastened at them. For that it is proposed to use a horizontal frame-like structure, which is equipped on the one side with one driven and one freewheeling set of wheels running on a curved rail, and fastened on the other side via a rotating plate on a rotating foundation. On this a tower-like portal structure is established, in which the electrode rod fixture and the furnace chamber are arranged. In the upper part of the portal the portal frame on the side of the rotating foundation is still supported by a further strutting arm, which can be swiveled. The costly tower structure as a whole is swiveled from one side to the other via the rotating foundation between a loading position and a melting position. As is usual in the case of such portal structures, during lifting of the electrode rod fixture the height of the plant is increased. In addition, considerable forces act on the electrode rod and furnace chamber fixture during swiveling, because these are free-hanging ones.

Object

The object of the invention was to overcome the above-described disadvantages of prior art. In particular, it was an aim to provide a generic remelting plant for metals comprising one or several melting sites, wherein during opening and closing the compact height of the plant remains constant and all forces, which act on the load-bearing structure, arise centrically and symmetrically. In addition, it was an aim that the design allows a good pressure and vacuum tightness of the plant.

DESCRIPTION OF THE INVENTION

This object is solved by a remelting plant for metals as well as a method for its operation according to the independent claims. Preferred design variants are subject matter of the dependent claims.

According to the present invention is a remelting plant for metals comprising

- one or several melting sites, which for the most part are arranged in the underground in a foundation of the remelting plant, with one crucible each;
- a furnace portal comprising a first and a second vertical column, which are connected on their upper end with two opposing sides of a horizontal connecting frame and along their height with at least one further frame formed by two brackets, wherein the furnace portal with the first vertical column is connected with the foundation such that it can be rotated, and with the second vertical column, the lower end of which is provided with a drive and at least one wheel, can be moved on a curved rail, so that the furnace portal can make a swiveling movement over the one or several melting sites;
- a one-piece furnace chamber, which is open on its lower side and which can be vertically moved within the frame being formed by the two brackets;
- openings, which are arranged on the sides of the connecting frame, which are not connected with the vertical columns;
- a plurality of locking elements, which are provided on the brackets and which are able to fix the furnace chamber in the vertical;
- a balance, which with its lower side is connected with the upper side of the furnace chamber;
- an electrode rod supporting structure comprising two columns with variable lengths, a lower plate being attached on their lower end and an upper plate being attached on their upper end, wherein the lower plate is connected with the balance and the upper plate is engaged with the openings of the connecting frame and can be moved vertically within them; and
- an electrode rod, which runs through the lower plate and the upper plate, with a coaxial electrode rod drive, which is fastened on the upper plate, wherein the electrode rod comprises an outer tube, an inner tube being movable therein and a spindle being arranged in the inner tube, and the electrode rod drive drives the spindle inside of the electrode rod.

An essential advantage of the remelting plants according to the present invention is the fact that a one-piece furnace chamber is used, which can be designed such that it is indeed gas- and vacuum-tight. For achieving a low height of construction in the case of the plants of prior art, the furnace chamber is divided either vertically into two half shells or horizontally into two chamber shell rings. Here, however, the half shell structures do in no case result in a really gas- or vacuum-tight state. The horizontal division, in turn, results in a more laborious handling and higher costs, because the lower chamber part has to be manufactured several times and has to be fastened separately on each coquille size.

In the case of remelting plants according to the present invention one or several melting sites can be provided in the foundation of the plant. For the most part, they are arranged in the underground, and they already minimize the required height of the work room. They can be arranged in the underground in an extent of more than 50%, more than 60%, more than 70%, more than 80%, more than 90% or more than 95%. Preferably, they are completely arranged in the underground. In this case the furnace chamber comprises an accordingly designed lower end, which allows a connection with the melting site being positioned completely in the underground.

Each melting site comprises a melting crucible, in which the melting process, which can be realized either according to the ESU or the VLBO method, takes place. A furnace portal consisting of two vertical columns, which are arranged parallel to each other, is fastened on the plant foundation in a manner such that it can be swiveled. The first of both columns is fastened on the foundation in a manner such that it can be rotated, the opposite second column comprises on its lower end a drive with one or several wheels being supported on a curved rail in the foundation. Accordingly, the melting sites are also arranged on a circular path around the rotational axis of the portal, namely in such a manner that the central axis thereof during swiveling of the portal concentrically overlies the central axis of it.

In the context of this application, the term "column" is not limited to a basically circular cylinder form of load-bearing constructional elements, but explicitly also comprises other forms having a high ratio of height to diameter, in particularly in the form of a cuboid element, T-girder or double T-girder. The term is also not limited to massive bodies, but also comprises hollow bodies, openwork structures and grid structures, insofar as they are still suitable with their structure to fulfil the required static load-bearing function.

It is highly preferred, when the connection of the first vertical column with the foundation, which is such that a rotational movement is possible, is realized by a large-diameter slewing ring bearing. These antifriction bearings comprise, in principle, any suitable form of ball bearings or roller bearings. For example, they may be ball bearings, cylinder roller bearings or taper roller bearings. Preferably, ball bearings are used. In this way, also in the case of heavy furnace chambers and electrodes a low-friction smooth swiveling movement of the portal can be achieved.

At their upper ends the vertical columns are connected with each other by a connecting frame, wherein the vertical columns along their height are connected at least one more time via two brackets, which form a further closed frame approximately in the middle of the portal height. When the middle of the portal height is mentioned, then in the context of this application this may mean the height range of 30% to 70% of the portal height. The height range may also be 35% to 65%, 40% to 60%, or 45% to 55%. The middle may be at least 30%, 35%, 40%, or 45% of the portal height. The middle may be at most 70%, 65%, 60%, or 55% of the portal height.

Between both vertical columns in the frame being formed by the brackets a one-piece furnace chamber, which is open on its lower side, is provided, and a balance rests on it. A one-piece furnace chamber, in particular, does not comprise a long crucible top part or spacer and thus minimizes the potential areas for leakages.

Preferably, the balance is designed as a gimbal frame on two weighing cells. So, on the one hand, the continuous weighing function during the melting process is allowed, so that it is possible to monitor the weight of the electrode which has to be melted. On the other hand, the gimbal function allows an alignment of the electrode in the melting crucible by tilting of the electrode rod, wherein both, the furnace chamber hanging on the balance and also the electrode hanging on the electrode rod are held vertically.

On the balance a lower plate of a frame-like electrode rod supporting structure is fastened. This electrode rod supporting structure consists, in turn, of two vertical columns with variable lengths and an upper plate, on which the electrode rod drive for the spindle in the electrode rod is fastened. Here, the lower plate, driven by the columns with variable lengths, can be moved in the vertical along the electrode rod, for which it comprises a duct. So, it is possible to lift the furnace chamber, without requiring a change of the height beyond the length of the electrode rod. The upper plate with the electrode rod drive is installed in two lateral openings in the girders, which are forming the connecting frame, such that it is secured against a lift-off upwards and, in the case of a minimum movement downwards, it rests on the lower rims of these openings.

The electrode rod comprises an outer tube, which represents the whole height of the electrode rod and is adapted to the electrode length as well as the height of the furnace chamber. The inner tube being moveable therein can be extended and retracted by the spindle being arranged therein, and thus it can realize a telescope-like function. On the lower end of the inner tube, then, the fixture for the electrode is fastened. Thus, it is possible without a vertical movement, which would result in an increase of the height of the plant, to lower the electrode, which is fastened on the electrode rod, into the crucible and/or to lift the fixture in an extent such that a new electrode can be fastened on it. The furnace chamber, in turn, together with the balance and the lower plate can be lifted via the columns with variable lengths along the electrode rod for being able to open and close the furnace. For this, the furnace chamber at the top is equipped with a vacuum-tight bushing. Through this double telescope-like function of the plant all the movement paths, which in the case of plants of prior art are normally outside the plant silhouette, are inside it, so that the height of the plant in any operating state remains the same.

In preferred design variants the upper plate is connected with the frame via two horizontally acting drives, which are arranged orthogonally to each other. They allow an adjustment of the electrode in the crucible via displacing of the upper plate. The drives may, for example, have the design of electro-mechanical cylinders or also of cylinders supplied with fluid. By actuating of the one or the other drive, the upper plate is displaced and thus the electrode rod is tilted, which with its lower end runs through the lower plate and is mounted in a moveable manner via the gimbal frame of the balance. So, such as described above, the electrode hanging on it is centered in the coquille.

The vertical columns with variable lengths of the electrode rod supporting structure can be provided as driven telescope-like structures. This can, for example, be realized as a hydraulic cylinder or a rack and pinion structure. It is highly preferred, when they are hydraulic cylinders. Preferably, the columns with variable lengths comprise a blocking function, which prevents an undesired change of the length during the remelting process.

In both brackets connecting the vertical columns a plurality of locking elements is installed, which serve for supporting the furnace chamber, when it is lifted. The locking elements may, for example, have the design of bolts or cylinders, which either can be moved into respective openings in the furnace chamber for fixing it in the height, or they can serve as a contact surface for its lower edge. The number of the locking elements depends on their loading capacity and the weight of the vertically moveable furnace structure with electrode rod fixture and electrode, which has to be borne.

A method for remelting metals according to the present invention in a remelting plant according to the present invention in accordance with one of the preceding claims comprises the steps of a) positioning of the furnace portal over one of the melting sites;

b) lifting of the furnace chamber into a lifted position by
retracting of the two columns with variable lengths of the electrode rod supporting structure, wherein the upper plate is supported on the lower rims of the openings of the connecting frame,
locking of the locking elements on the brackets, and
extending of the two columns with variable lengths by a length, which is smaller than the height of the openings, so that the upper plate is no longer supported on the lower rims of the openings and the furnace chamber rests on the locking elements;

c) fastening of an electrode made of the metal which has to be remelted on the electrode rod;

d) placing of the furnace chamber on the crucible by
retracting of the two columns with variable lengths of the electrode rod supporting structure by a length, which is smaller than the height of the openings of the connecting frame, so that the upper plate again is supported on the lower rims of the openings and the furnace chamber no longer rests on the locking elements on the brackets,
unlocking of the locking elements on the brackets, and
extending of the two columns with variable lengths, until the furnace chamber rests on the crucible;

e) extending of the two columns with variable lengths by a length, which is smaller than the height of the openings of the connecting frame, so that the upper plate is no longer supported on the lower rims of the openings, and arresting of the two columns with variable lengths;

f) remelting of the electrode under application of a voltage and repositioning of the electrode by extending of the electrode rod;

g) opening of the crucible by repeating of step b) and removal of the remelted metal.

It is highly preferred, when in step c) the electrode made of the metal which has to be remelted which is clamped at the electrode rod is centered in the furnace chamber by means of the horizontally acting drives.

The method for the use of the remelting plant according to the present invention is exemplarily explained below.

On grounds of increasing productivity, remelting plants normally are constructed with two melting sites. This construction type allows the parallel working of the employees at both melting sites, wherein on the one melting site the melting process is conducted and the second melting site is prepared for the next melting. The preparatory works for the melting in the second melting site comprise besides the exchange of the crucible also the insertion of the next electrode which has to be remelted and, in the case of the ESU methods, the filling in of the slag. Optionally, in addition, the electrode is aligned. Accordingly, analogously thereto also the method according to the present invention is designed. The furnace portal is positioned above one of the, for example, two melting sites and the furnace chamber is present in the lifted position above the new electrode, which has to be remelted and which has been inserted into the crucible as is customary. The columns with variable lengths of the electrode rod supporting structure, which in this example are hydraulic cylinders, are retracted and the locking elements in the form of cylinder bolts are extended such that the furnace chamber is supported by them.

The clamping mechanism of the electrode rod, which has been extended down to the height of the electrode, is now opened and the stub of the electrode which has to be remelted is clamped.

Subsequently, the electrode is slightly lifted by retracting the electrode rod. So, the electrode hangs clamped at the electrode rod, which, in turn, is supported on the balance, which, in turn, is fastened on the furnace chamber. Both horizontal drives connecting the upper plate with the connecting frame are activated such that the electrode by tilting with respect to both axis of the gimbal frame of the balance is centered in the furnace chamber and thus also in the crucible in the melting site, and thus it is prepared for the upcoming melting.

Subsequently, both hydraulic cylinders of the electrode rod supporting structure are retracted, so that the upper plate of the electrode rod supporting structure is supported on the lower rim of the openings of the connecting frame and the furnace chamber is lifted off from the locking elements. Then, the unloaded locking elements are retracted. So, the way of the furnace chamber downwards is free and by extending the hydraulic cylinders of the electrode rod supporting structure the furnace chamber is placed tightly on the crucible. The whole weight of furnace chamber, balance, electrode rod with electrode being clamped on it, and electrode rod drive during the movement of the chamber downwards hangs centrically on the connecting frame and thus is symmetrically distributed to both portal columns. Here, only vertical compressive forces are created on the foundation and in all construction components there are no bending moments.

Once the furnace chamber has been placed on the crucible, the two hydraulic cylinders of the electrode rod supporting structure are extended in an extent such that the upper plate of the electrode rod supporting structure is lifted off from the lower rim of the openings of the connecting frame, and that the weight of furnace chamber, balance, electrode rod with electrode which is clamped on it, and electrode rod drive is now transferred onto the melting site. In this state the hydraulic cylinders of the electrode rod supporting structure are hydraulically blocked and the melting can be started.

By extending the electrode rod, according to the remelting recipe the electrode is slowly deposited in the crucible and remelted. Once the melting has been completed, at first the electrode rod is retracted, subsequently the hydraulic cylinders of the electrode rod supporting structure are also retraced in an extent such that they at first place the upper plate on the lower rim of the openings in the connecting frame and subsequently lift the furnace chamber with the balance along the electrode rod vertically upwards. When the furnace chamber has reached its highest position, the locking elements are extended, the movement of the hydraulic cylinders of the electrode rod supporting structure is reversed. Now, they are extending so long, until the furnace chamber again is placed on the extended locking elements. All forces which arise during the opening process and during the melting always act in a centric and symmetric manner onto the load-bearing structure of the plant or onto the melting site, and therefore, neither in the foundation nor in the structure of the plant, they create bending moments.

By the lifting of the furnace chamber vertically along the electrode rod and the changing of the length of the columns of the electrode rod supporting structure a proper opening and closing of the plant without any negative alteration of the height of the plant is guaranteed. There is no "growing" of the plant—its height is optimally adjusted to the electrode length and the required lift of the electrode rod. By the placing/resting of the upper plate in the openings of the connecting frame and the lifting off thereof, it can be achieved that the furnace portal via the connecting frame in the opening and closing mode of the plant bears the weight of furnace chamber, balance, electrode rod supporting structure, electrode rod, and electrode in a free-hanging manner, while in the melting mode, when the furnace is closed, the weight of electrode rod supporting structure, electrode rod, and electrode is loaded onto the balance, and thus allows a weighing of the electrode during the melting process.

SHORT DESCRIPTION OF THE FIGURES

FIG. 1 is a perspective view of a remelting plant according to the present invention in accordance with the ESU method in the closed state during melting.

FIG. 2 is a perspective view of a remelting plant according to the present invention in accordance with the VLBO method in the closed state during melting.

FIG. 3 is a sectional view of the remelting plant of FIG. 1 in the opened state prior to melting.

FIG. 4 is a perspective view of the balance with a gimbal frame.

FIG. 5 is a perspective view of the connecting frame with the upper plate for the electrode rod supporting structure.

FIG. 6 is a sectional view of the connecting frame with the upper plate for the electrode rod supporting structure.

DESCRIPTION OF THE FIGURES

The figures only show a preferred design variant as an example for the invention. Therefore, they should not be construed as limiting. In particularly, they show useful combinations of features, which, however, can also be used singly or in other combinations.

Figure 1:
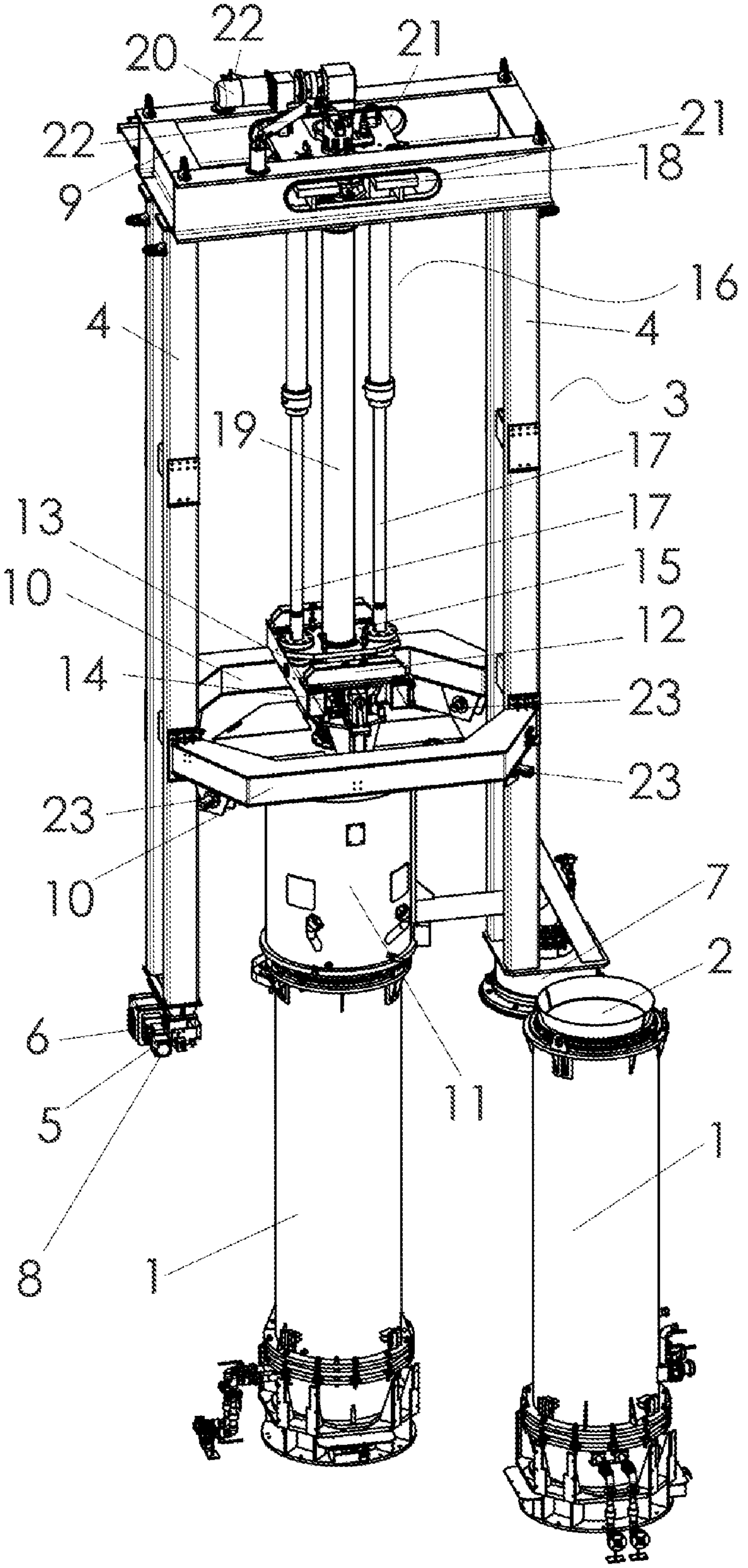
FIG. 1 shows a perspective view of a remelting plant according to the present invention in accordance with the ESU method in the closed state during melting. In this example presented the remelting plant comprises two melting sites (1). The melting sites (1) are provided in the foundation of the plant. The melting sites (1) contain a melting crucible (2), in which the melting process takes place. A furnace portal (3) consisting of two vertical columns (4) being arranged parallel to each other is fastened in a swiveling manner on the foundation of the plant.

One of both vertical columns (4) is fastened on the foundation in a rotating manner via a large-diameter slewing ring bearing (7), the opposite vertical column (4) comprises on its lower end a drive (5) with wheel (6), which rests on a curved rail (8) on the foundation. On their upper ends the vertical columns (4) are connected by a rectangular connecting frame (9) with each other. Furthermore, approximately at 40% of the portal height the vertical columns (4) are once again connected via two brackets (10), which form a further closed frame.

Between both vertical columns (4) in the frame being formed by the brackets (10) a one-piece furnace chamber (11) which is open on its lower side is provided, on which a balance (12) rests. On the balance (12), which is designed as a gimbal frame (13) on two weighing cells (14), a lower plate (15) of a frame-like electrode rod supporting structure (16) is fastened. This electrode rod supporting structure (16)

consists, in turn, of two vertical columns (17) with variable lengths and an upper plate (18), on which the electrode rod drive (20) with the electrode rod (19) is fastened. Here, the vertical columns (17) with variable lengths of the electrode rod supporting structure (16) are provided as driven telescope-like structures in the form of hydraulic cylinders. The upper plate (18) with the electrode rod drive (20) is installed in two lateral openings (21) in the girders forming the connecting frame (9) such that it is protected against lifting off upwards and that in the case of a minimum movement downwards it rests on the lower rims of these openings (21).

In addition, the upper plate (18) is connected via two horizontally acting drives (22) which are arranged orthogonally to each other with the girders of the frame (9). In the presentation of FIG. 1, the second drive (22) can only be seen partly, because in viewing direction it is arranged behind the electrode rod drive (20). In both brackets (10) connecting the vertical columns (4) cylindrical bolts as locking elements (23) are installed, which serve for supporting the furnace chamber (11), when it is lifted.

Figure 2:
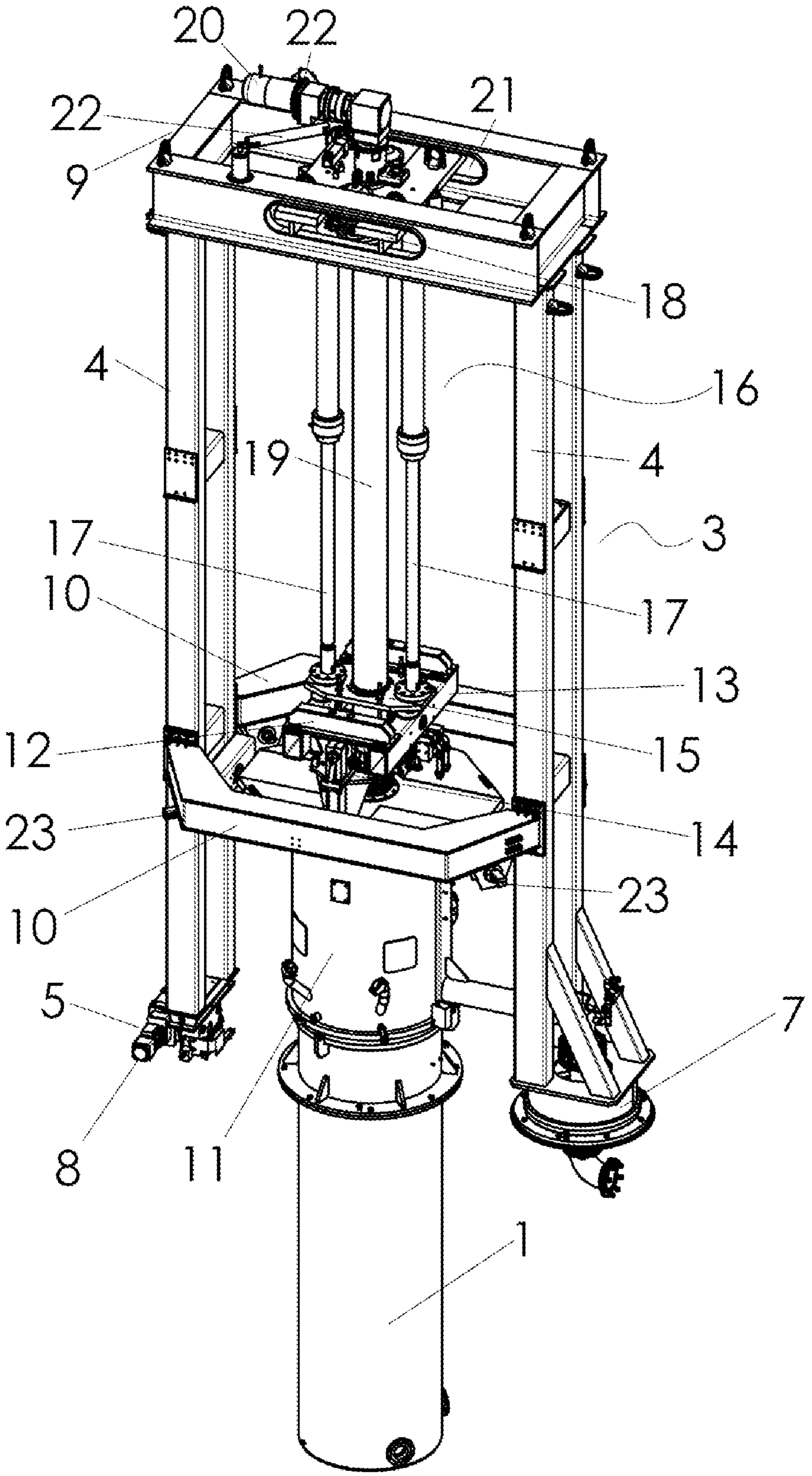

FIG. 2 shows a perspective view of a remelting plant according to the present invention in accordance with the VLBO method in the closed state during melting. In the case of this plant the whole upper plant section is identical to the plant in accordance with the ESU method of FIG. 1. Only the melting site (1) is different, which is correspondingly designed for the VLBO method. In FIG. 2 only one of the melting sites (1) is shown.

Figure 3:
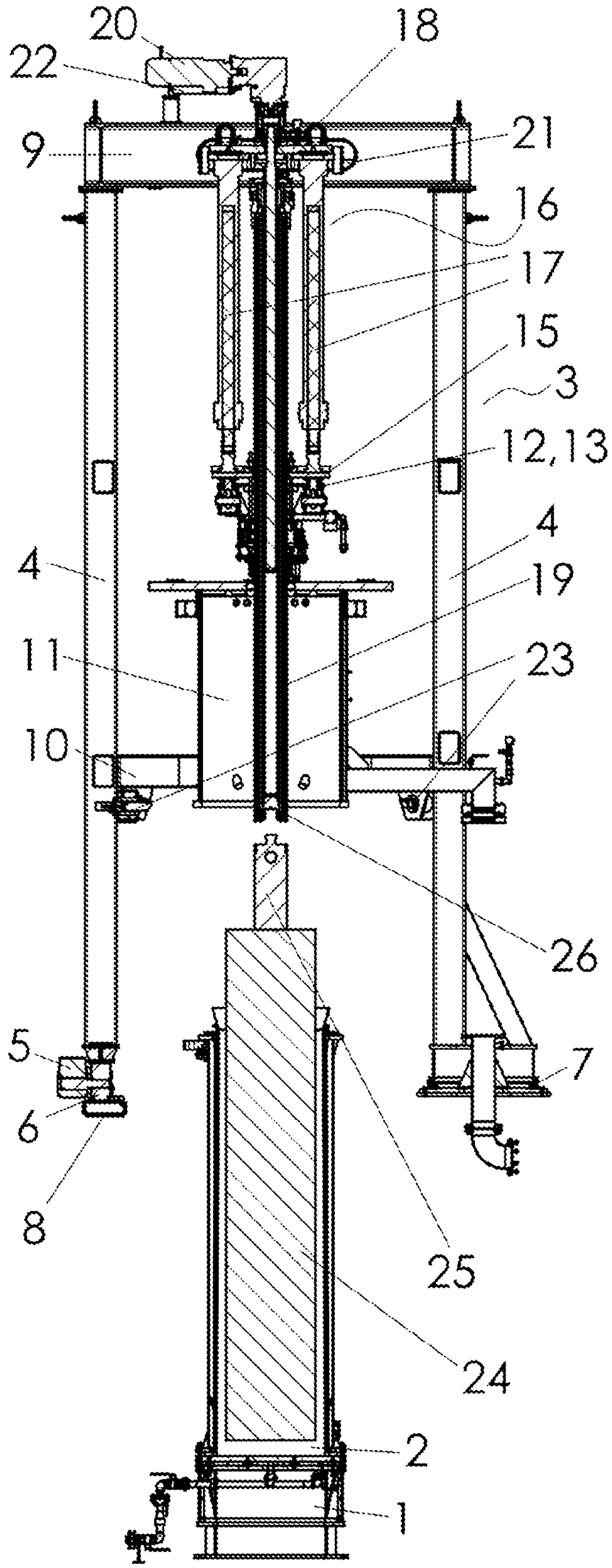

FIG. 3 shows a sectional view of the remelting plant of FIG. 1 in the opened state prior to melting. The section runs vertically exactly through the center of the plant. The two vertical columns (17) with variable lengths of the electrode rod supporting structure (16) are retracted. The furnace chamber (11) hangs in the upper position and it is arrested by means of the locking elements (23). Here, the lower rim of the furnace chamber (11) is positioned a little bit below the height of the brackets (10). In the crucible (2) already the new electrode (24) which has to be remelted is inserted, which is then clamped with its stub (25) onto the electrode rod clamp (26). The double tube structure of the electrode rod (19) with the spindle inside can well be seen. Via this spindle the electrode rod clamp (26) is lowered in an extent such that the stub (25) can be grasped. Subsequently, the electrode rod (19) is retracted again, so that the electrode (24) hangs freely and can be adjusted.

It can also be seen that in this position the upper plate (18) rests on the lower rim of the lateral openings (21) in the girders of the connecting frame (9).

Figure 4:
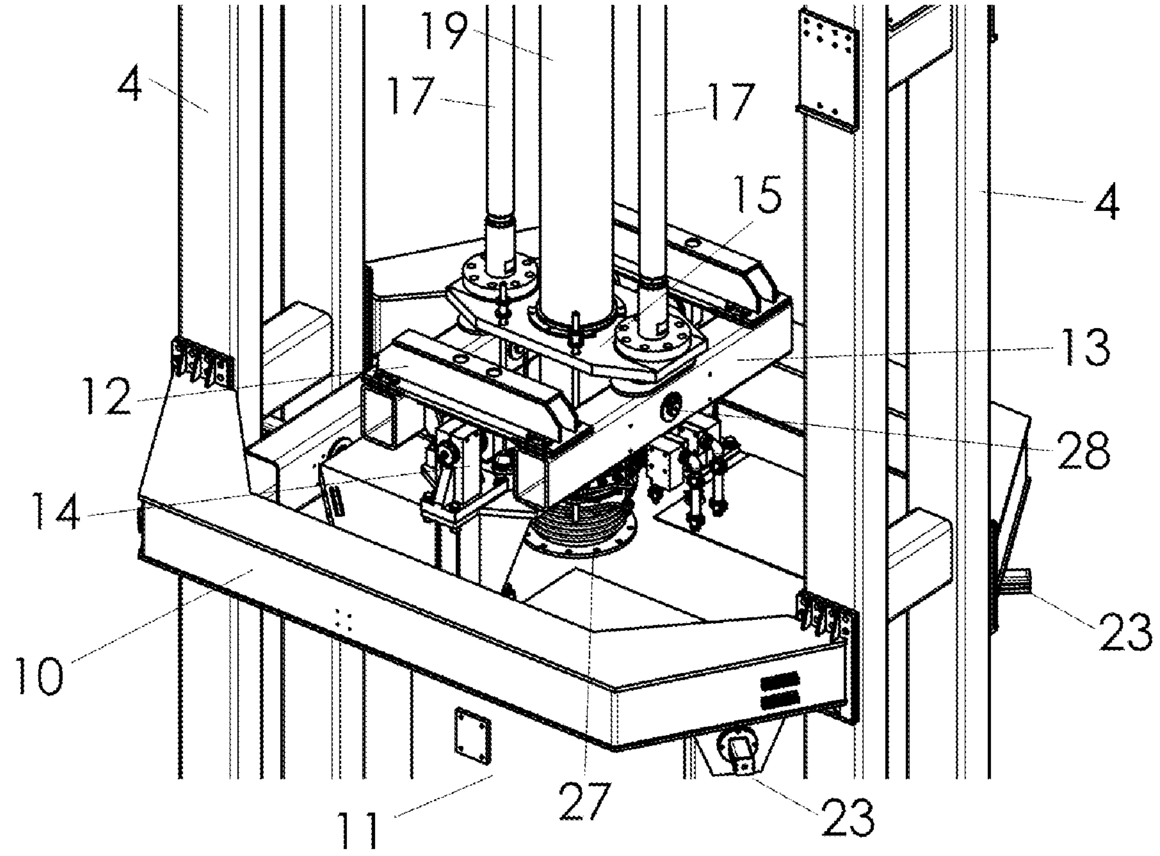

FIG. 4 shows a perspective view of the balance (12) with the gimbal frame (13) of the remelting plant being in the closed melting position. In this presentation of a detailed section can be seen, how the electrode rod (19) runs through the upper plate (15) and the vacuum-tight bushing (27) into the furnace chamber (11). The lower plate (15) is connected with the gimbal frame (13) of the balance (12) via the joint (28). The second joint direction of the gimbal frame (13) form the weighing cells (14). During retracting of the columns (17) with variable lengths the furnace chamber (11) with the vacuum-tight bushing slides upwards on the electrode rod (19), guided by the lower plate (15). When the upper plate (18) by means of the drives (22) is moved for aligning the electrode (24) in the crucible (2), and so the electrode rod (19) is tilted, then this movement can be compensated by the gimbal frame (13) via the joints (28) and the weighing cells (14).

Figure 5:
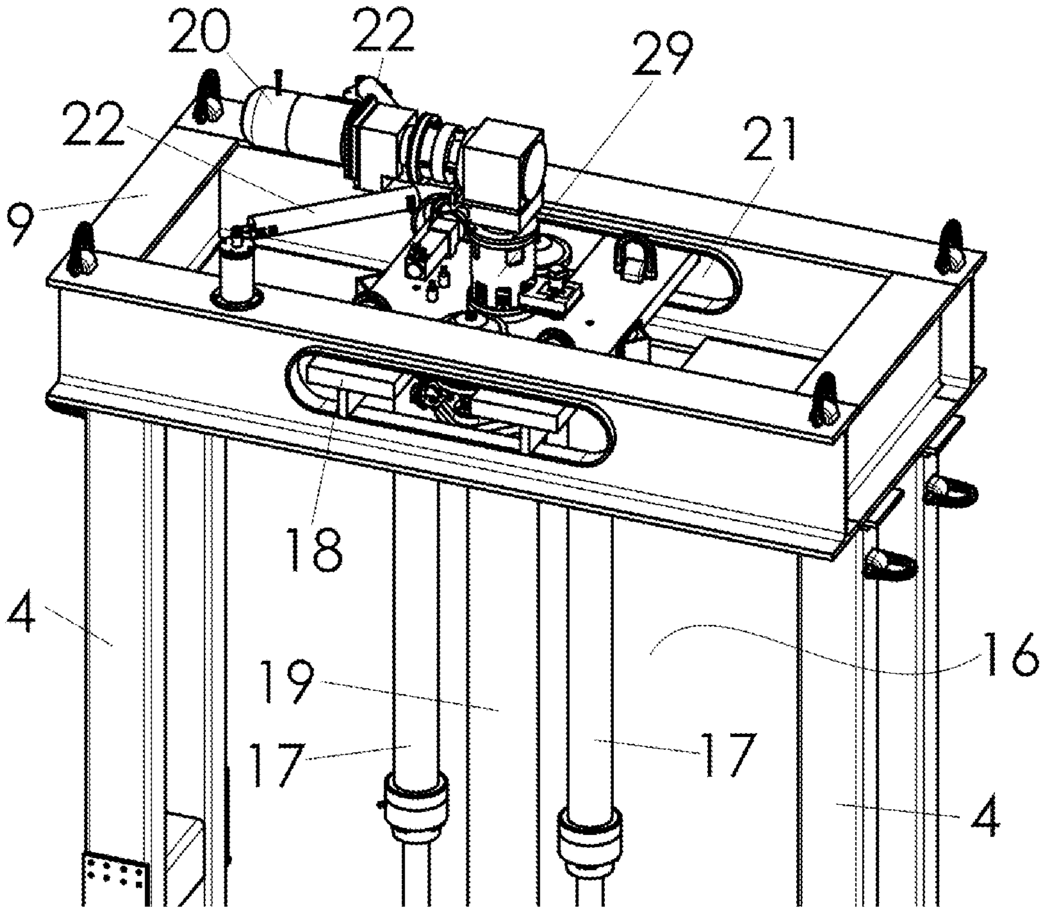

FIG. 5 shows a perspective view of the connecting frame (9) with the upper plate (18) for the electrode rod supporting structure (16). Now, in the view obliquely from above, both horizontally acting drives (22) which are arranged orthogonally to each other can be seen better. In this example they are hydraulic cylinders. In the center of the upper plate (18) on the yoke (29) of the electrode rod (19) the electrode rod drive (20) is located. The upper plate (18) engages with the openings (21) of the connecting frame (9).

Figure 6:
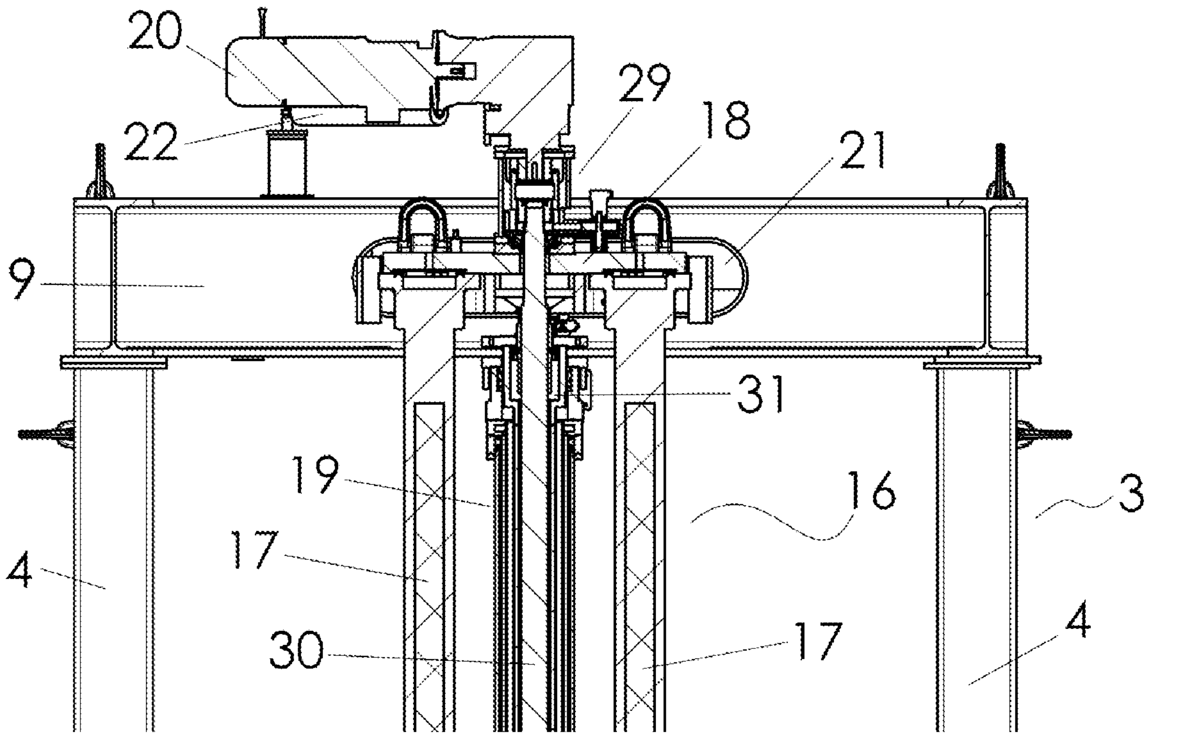

FIG. 6 shows a sectional view of the connecting frame (9) with the upper plate (18) for the electrode rod supporting structure (16). The sectional view shows well the double tube structure of the electrode rod (19) and the spindle (30) being arranged in it, which is connected with the upper end of the inner tube of the electrode rod (19) via the spindle nut (31). In this view also the fastening of the spindle (30) in the yoke (29) on the electrode rod drive (20) can be seen.

LIST OF REFERENCE SIGNS

| | |
|---|---|
| 1 | melting site |
| 2 | crucible |
| 3 | furnace portal |
| 4 | vertical column |
| 5 | drive |
| 6 | wheel |
| 7 | large-diameter slewing ring bearing |
| 8 | rail |
| 9 | connecting frame |
| 10 | bracket |
| 11 | furnace chamber |
| 12 | balance |
| 13 | gimbal frame |
| 14 | weighing cell |
| 15 | lower plate |
| 16 | electrode rod supporting structure |
| 17 | column with variable lengths |
| 18 | upper plate |
| 19 | electrode rod |
| 20 | electrode rod drive |
| 21 | opening |
| 22 | drive |
| 23 | locking element |
| 24 | electrode |
| 25 | stub |
| 26 | electrode rod clamp |
| 27 | bushing |
| 28 | joint |
| 29 | yoke |
| 30 | spindle |
| 31 | spindle nut |

The invention claimed is:

1. A remelting plant for metals comprising one or more melting sites, which for the most part are arranged underground in a foundation of the remelting plant, with one crucible each;

a furnace portal comprising a first and a second vertical column, which are connected on their upper ends with two opposing sides of a horizontal connecting frame and along their heights with at least one further frame formed by two brackets, wherein the furnace portal with the first vertical column is connected with the foundation such that the furnace portal can be rotated, and with the second vertical column, a lower end of which is provided with a drive and at least one wheel, can be moved on a curved rail, so that the furnace portal can make a swiveling movement over the one or several melting sites;

a one-piece furnace chamber, which is open on its lower side and which can be vertically moved within the frame being formed by the two brackets;

openings, which are arranged on sides of the connecting frame, which are not connected with the vertical columns;

a plurality of locking elements, which are provided on the brackets and which are able to fix the furnace chamber in a vertical direction;

a balance, which with its lower side is connected with an upper side of the furnace chamber;

an electrode rod supporting structure comprising two columns with variable lengths, a lower plate being attached on their lower end and an upper plate being attached on their upper end, wherein the lower plate is connected with the balance and the upper plate is engaged with the openings of the connecting frame and can be moved vertically within them; and an electrode rod, which runs through the lower plate and the upper plate, with a coaxial electrode rod drive, which is fastened on the upper plate, wherein the electrode rod comprises an outer tube, an inner tube being movable therein and a spindle being arranged in the inner tube, and the electrode rod drive drives the spindle inside of the electrode rod.

2. The remelting plant according to claim 1, wherein a connection of the first vertical column with the foundation, which is such that a rotational movement is possible, is realized by a slewing bearing.

3. The remelting plant according to claim 1, wherein the balance is designed as a gimbal frame on two weighing cells.

4. The remelting plant according to claim 1, wherein the upper plate is connected with the frame via two horizontally acting drives being arranged orthogonally to each other.

5. A method for remelting metals in the remelting plant according to claim 1, comprising the steps of:

a) positioning of the furnace portal over one of the melting sites;

b) lifting of the furnace chamber into a lifted position by retracting of the two columns with variable lengths of the electrode rod supporting structure, wherein the upper plate is supported on lower rims of the openings of the connecting frame, locking of the locking elements on the brackets, and extending of the two columns with variable lengths by a length, which is smaller than the height of the openings, so that the upper plate is no longer supported on the lower rims of the openings and the furnace chamber rests on the locking elements;

c) fastening of an electrode made of the metal which has to be remelted on the electrode rod;

d) placing of the furnace chamber on the crucible by retracting of the two columns with variable lengths of the electrode rod supporting structure by a length, which is smaller than a height of the openings of the connecting frame, so that the upper plate again is supported on the lower rims of the openings and the furnace chamber no longer rests on the locking elements on the brackets, unlocking of the locking elements on the brackets, and extending of the two columns with variable lengths, until the furnace chamber rests on the crucible;

e) extending of the two columns with variable lengths by a length, which is smaller than the height of the openings of the connecting frame, so that the upper plate is no longer supported on the lower rims of the openings, and arresting of the two columns with variable lengths;

f) remelting of the electrode under application of a voltage and repositioning of the electrode by extending of the electrode rod;

g) opening of the crucible by repeating of step b) and removal of a remelted metal.

6. The method for remelting according to claim 5, wherein in step c) the electrode made of the metal which has to be remelted, which is clamped on the electrode rod, is centered in the furnace chamber by means of the horizontally acting drives.

7. A method for remelting metals in the remelting plant according to claim 2, comprising the steps of:

a) positioning of the furnace portal over one of the melting sites;

b) lifting of the furnace chamber into a lifted position by retracting of the two columns with variable lengths of the electrode rod supporting structure, wherein the upper plate is supported on lower rims of the openings of the connecting frame, locking of the locking elements on the brackets, and extending of the two columns with variable lengths by a length, which is smaller than the height of the openings, so that the upper plate is no longer supported on the lower rims of the openings and the furnace chamber rests on the locking elements;

c) fastening of an electrode made of the metal which has to be remelted on the electrode rod;

d) placing of the furnace chamber on the crucible by retracting of the two columns with variable lengths of the electrode rod supporting structure by a length, which is smaller than a height of the openings of the connecting frame, so that the upper plate again is supported on the lower rims of the openings and the furnace chamber no longer rests on the locking elements on the brackets, unlocking of the locking elements on the brackets, and extending of the two columns with variable lengths, until the furnace chamber rests on the crucible;

e) extending of the two columns with variable lengths by a length, which is smaller than the height of the openings of the connecting frame, so that the upper plate is no longer supported on the lower rims of the openings, and arresting of the two columns with variable lengths;

f) remelting of the electrode under application of a voltage and repositioning of the electrode by extending of the electrode rod;

g) opening of the crucible 2 by repeating of step b) and removal of a remelted metal.

8. The method for remelting according to claim 7, wherein in step c) the electrode made of the metal which has to be remelted, which is clamped on the electrode rod, is centered in the furnace chamber by means of the horizontally acting drives.

9. A method for remelting metals in the remelting plant according to claim 3, comprising the steps of:

a) positioning of the furnace portal over one of the melting sites;

b) lifting of the furnace chamber into a lifted position by retracting of the two columns with variable lengths of the electrode rod supporting structure, wherein the upper plate is supported on lower rims of the openings of the connecting frame, locking of the locking elements on the brackets, and extending of the two columns with variable lengths by a length, which is smaller than the height of the openings, so that the upper plate is no longer supported on the lower rims of the openings and the furnace chamber rests on the locking elements;

c) fastening of an electrode made of the metal which has to be remelted on the electrode rod;

d) placing of the furnace chamber on the crucible by retracting of the two columns with variable lengths of the electrode rod supporting structure by a length, which is smaller than a height of the openings of the connecting frame, so that the upper plate again is supported on the lower rims of the openings and the furnace chamber no longer rests on the locking elements on the brackets, unlocking of the locking elements on the brackets, and extending of the two columns with variable lengths, until the furnace chamber rests on the crucible;

e) extending of the two columns with variable lengths by a length, which is smaller than the height of the openings of the connecting frame, so that the upper plate is no longer supported on the lower rims of the openings, and arresting of the two columns with variable lengths;

f) remelting of the electrode under application of a voltage and repositioning of the electrode by extending of the electrode rod;

g) opening of the crucible 2 by repeating of step b) and removal of a remelted metal.

10. The method for remelting according to claim 9, wherein in step c) the electrode made of the metal which has to be remelted, which is clamped on the electrode rod, is centered in the furnace chamber by means of the horizontally acting drives.

11. A method for remelting metals in a-in the remelting plant according to claim 4, comprising the steps of:

a) positioning of the furnace portal over one of the melting sites;

b) lifting of the furnace chamber into a lifted position by retracting of the two columns with variable lengths of the electrode rod supporting structure, wherein the upper plate is supported on lower rims of the openings of the connecting frame, locking of the locking elements on the brackets, and extending of the two columns with variable lengths by a length, which is smaller than the height of the openings, so that the upper plate is no longer supported on the lower rims of the openings and the furnace chamber rests on the locking elements;

c) fastening of an electrode made of the metal which has to be remelted on the electrode rod;

d) placing of the furnace chamber on the crucible by retracting of the two columns with variable lengths of the electrode rod supporting structure by a length, which is smaller than a height of the openings of the connecting frame, so that the upper plate again is supported on the lower rims of the openings and the furnace chamber no longer rests on the locking elements on the brackets, unlocking of the locking elements on the brackets, and extending of the two columns with variable lengths, until the furnace chamber rests on the crucible;

e) extending of the two columns with variable lengths by a length, which is smaller than the height of the openings of the connecting frame, so that the upper plate is no longer supported on the lower rims of the openings, and arresting of the two columns with variable lengths;

f) remelting of the electrode under application of a voltage and repositioning of the electrode by extending of the electrode rod;

g) opening of the crucible 2 by repeating of step b) and removal of a remelted metal.

12. The method for remelting according to claim 11, wherein in step c) the electrode made of the metal which has to be remelted, which is clamped on the electrode rod, is centered in the furnace chamber by means of the horizontally acting drives.

* * * * *